United States Patent [19]

Meyer

[11] Patent Number: 5,092,273
[45] Date of Patent: Mar. 3, 1992

[54] COLLAPSIBLE LIVESTOCK FEEDER

[75] Inventor: Larry A. Meyer, Dorchester, Wis.

[73] Assignee: Meyer Manufacturing Corp., Dorchester, Wis.

[21] Appl. No.: 589,972

[22] Filed: Sep. 28, 1990

[51] Int. Cl.⁵ .............................. A01K 5/00
[52] U.S. Cl. ...................... 119/52.4; 119/58; 296/14
[58] Field of Search ............ 119/52.1, 58, 59, 60, 119/52.4; 296/13, 14, 27, 6

[56] References Cited

U.S. PATENT DOCUMENTS

| 41,216 | 1/1864 | Hale | 119/58 |
|---|---|---|---|
| 53,346 | 3/1866 | Romans | 119/58 |
| 57,772 | 9/1866 | Robbins | 119/58 |
| 335,384 | 2/1886 | Phillips | 119/58 |
| 908,472 | 1/1909 | Lyons | 296/27 |
| 1,347,070 | 7/1920 | York | 119/58 |
| 1,425,171 | 8/1922 | Bromley | 296/6 |
| 1,445,886 | 2/1923 | Horsch | 296/14 |
| 1,916,230 | 7/1933 | Murray | 119/52.1 |
| 2,456,013 | 12/1948 | Nelson | 296/27 |
| 2,797,662 | 7/1957 | Adams | 119/52.4 |
| 2,830,557 | 4/1958 | Frush | 119/52.1 |
| 2,936,735 | 5/1960 | Smith | 119/52.1 |
| 3,249,090 | 5/1966 | Ripley | 119/52.1 |
| 3,336,908 | 8/1967 | Swanson | 119/60 |
| 3,782,333 | 1/1974 | Feteri | 119/58 |
| 3,834,353 | 9/1974 | Groezinger | 119/60 |
| 3,999,520 | 12/1976 | Feterl | 119/58 |
| 4,078,523 | 3/1978 | Etzler | 119/58 |
| 4,258,663 | 3/1981 | Schoessow | 119/58 |
| 4,265,477 | 5/1981 | Hall | 296/14 |
| 4,364,333 | 12/1982 | Touchette | 119/52.4 |

FOREIGN PATENT DOCUMENTS 0204820 2/1968 U.S.S.R. ................. 119/58

Primary Examiner—Robert P. Swiatek
Assistant Examiner—Todd E. Manahan
Attorney, Agent, or Firm—Andrus, Sceales, Starke & Sawall

[57] ABSTRACT

A livestock feeder has a trough bed and a bin for storing and dispensing feed mounted above and spaced from the bed, the bin being collapsible onto the bed for facilitating shipment and storage of the feeder. When the bin is collapsed onto the bed, the livestock feeder can support a payload without damage to the collapsed bin. The feeder may include wheels to define a wagon bunk-type feeder, wherein the feeder can be converted to other uses when the bin is in the collapsed position.

15 Claims, 3 Drawing Sheets

COLLAPSIBLE LIVESTOCK FEEDER

BACKGROUND OF THE INVENTION

This invention relates to livestock feeders, and more particularly, to a mobile bunk feeder for feeding cattle and the like.

Livestock feeders for storing and dispensing fibrous feeds such as hay, chopped green feed and ground feeds to cattle and other large animals are well known. Examples of such feeders are Smith U.S. Pat. No. 2,936,735 which discloses a wagon-type feeder with a 90° turning radius, Swanson U.S. Pat. No. 3,336,908 which discloses a device for forming a haystack and dispensing feed therefrom, Feterl U.S. Pat. 3,782,333 which discloses a wagon feeder including feed troughs and a plurality of segregated feeding compartments, and Schoessow U.S. Pat. No. 4,258,663 which discloses a wagon bed defining a pair of feed troughs and a feed bin mounted above the bed for storing and dispensing feed. The Schoessow patent, in particular, discloses a slant bar arrangement for discouraging the animal's movement away from the feeder during feeding, thereby reducing waste of feed stocks. The bin is formed of side and end walls supported above the trough bed, whereby the animals may insert their heads between the slant bars and into the space between the bin and the trough.

It is also known in the art to provide feeders with a horizontal cable system in lieu of the slant bars, the cable system being placed to restrain movement of the head of the animal, requiring the animal to cock its head to withdraw from the trough. The cable system is also effective to reduce waste by discouraging withdrawal of the animal from the feeder during feeding.

The bunk feeder wagons of the prior art are rigid, permanent assemblies which cannot be easily disassembled for shipment, storage or conversion to alternate uses.

SUMMARY OF THE INVENTION

The present invention provides a livestock of the bunk feeder wagon type which includes a trough bed and a bin supported above the bed for storing and dispensing a large variety of feed stocks including, by way of example, baled and loose hay, cut greens and ground feeds. The bin is collapsible into the trough bed and can be self-stowed to facilitate shipment, storage and conversion of the feeder to other uses.

The feeder includes a bed which defines a pair of feeding troughs extending along the length of the wagon and a feed storage and dispensing bin carried by the wagon above the troughs. The bin is defined by a pair of outer side walls, each mounted on a frame which is pivotably mounted on the wagon. Removable end gates are placed across and close the open ends of the side walls to the bin. The end gates may be removed and the side walls pivoted into the wagon to facilitate shipment and/or storage of the bunk feeder wagon.

The bin is designed such that the side walls conform to and nest against the contours of the trough bed when in the collapsed, stowed position. The end gates are designed to be placed in the wagon and on the collapsed side walls when stowed. The side panels of the wagon are above the stowed bin components and may be used to support a payload without risk of damage to the bin or trough bed.

The feeder also includes a cable restraining system mounted on and carried by the bin components, whereby the cable system may also be stowed in the wagon when the bin components are in the collapsed, stowed position.

It is, therefore, an object of the present invention to provide a livestock feeder having a trough bed and a bin supported above the bed for storing and dispensing feed.

It is a further object of the present invention to provide a feeder bin which may be collapsed into and stowed in the trough bed of a feeder wagon, facilitating shipment, storage and conversion of the bunk feeder to other uses.

It is an additional object of the invention to provide a livestock feeder with a cable restraining system which may be stowed in the trough bed of the wagon when the wagon is converted to other uses.

Other objects and features of the invention will be readily apparent from the accompanying drawing and description of the preferred embodiment.

DETAILED DESCRIPTION OF THE PREFERRED EMBODIMENT

Figure 1:
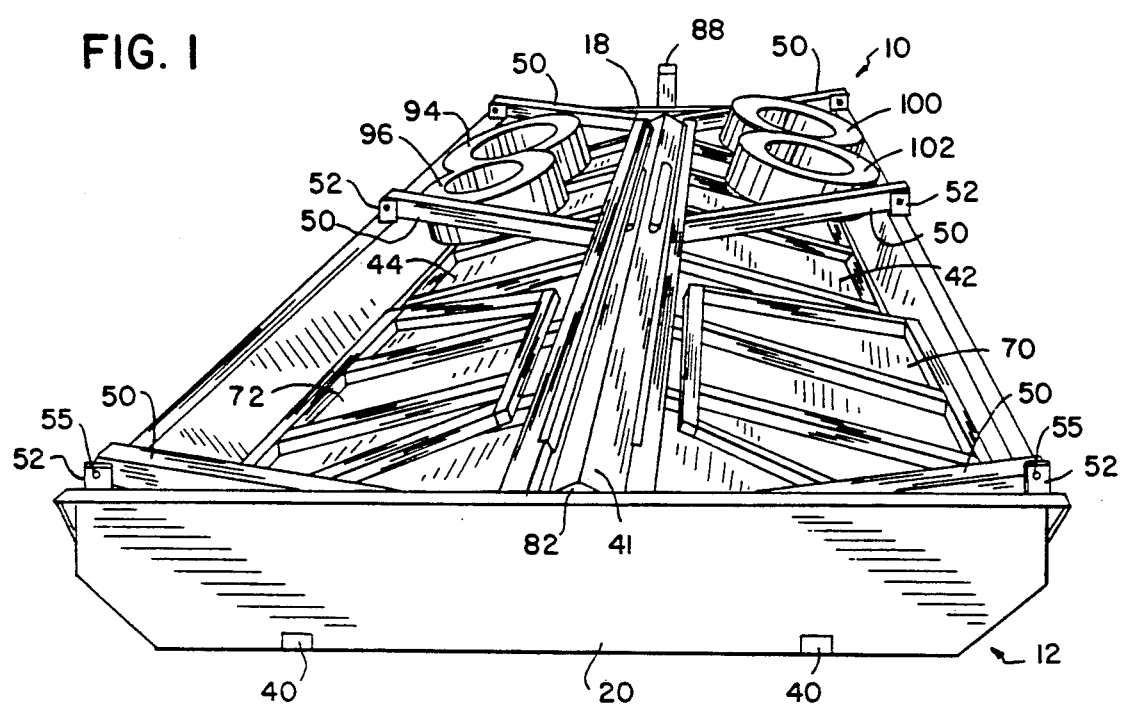
FIG. 1 is a perspective of the livestock feeder of the present invention shown in its collapsed and stowed position.
Figure 2:
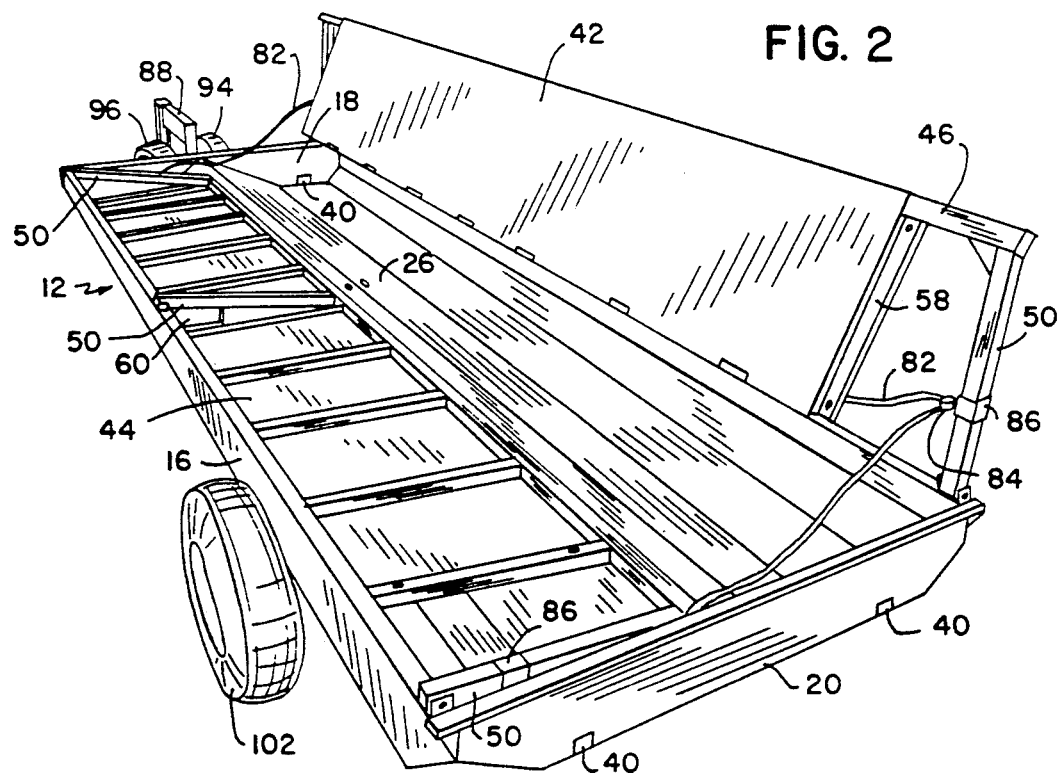
FIG. 2 is a perspective view of the livestock feeder of FIG. 1 with the front and rear wheels mounted and a first side wall raised to the open position.
Figure 5:
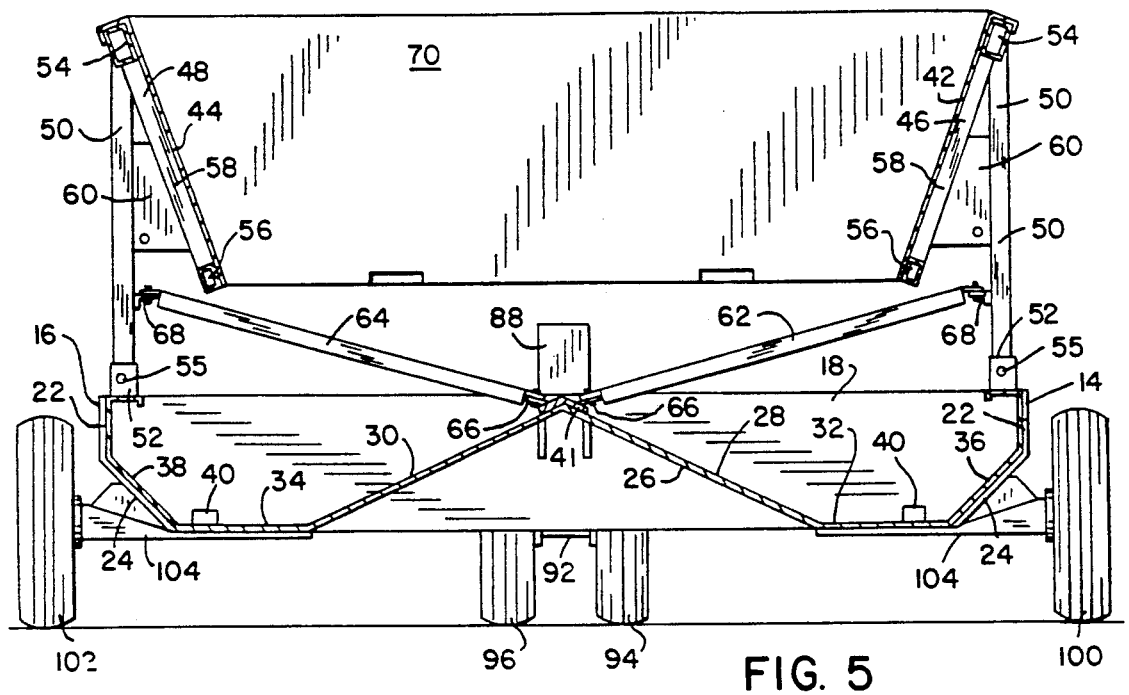
FIG. 5 is a section view of the livestock feeder taken generally at section line 5—5 of FIG. 4.

As shown in FIG. 1, the livestock feeder of the preferred embodiment is a bunk feeder wagon 10 and a feed bin which may be collapsed and all components self-stowed to provide a shallow, compact package for shipment and/or storage. A rectangular frame 12 comprises a pair of elongate side panels 14, 16 (FIG. 5) welded or otherwise suitably secured to a pair of end panels 18, 20 (FIG. 2). As best shown in FIG. 5, the side panels 14, 16 are formed to provide a substantially vertical section 22 and an inclined section 24 to support a formed, single sheet bed 26. The bed 26 of the preferred embodiment is manufactured of formed sheet steel. However, it will be understood by those skilled in the art that any suitable material may be substituted depending on application. As is typical of bunk-type feeders, the center sections 28, 30 of the bed are inclined to form a slide for directing feed from the center of the bed to the trough areas 32, 34. The inclined outer walls 36, 38 of the bed are provided to assure that the feed is always directed toward the center of the trough areas. The end walls of the feed bed 26 are provided by the frame end panels 18 and 20 of the wagon frame 12. Drain holes 40 in the end panels 18, 20 provide drainage for the trough areas 32, 34. A center reinforcing rail 41 is welded or otherwise suitably secured to the center peak of the bed 26 and may be welded to the end panels 18, 20 to further strengthen the bed.

Figure 4:
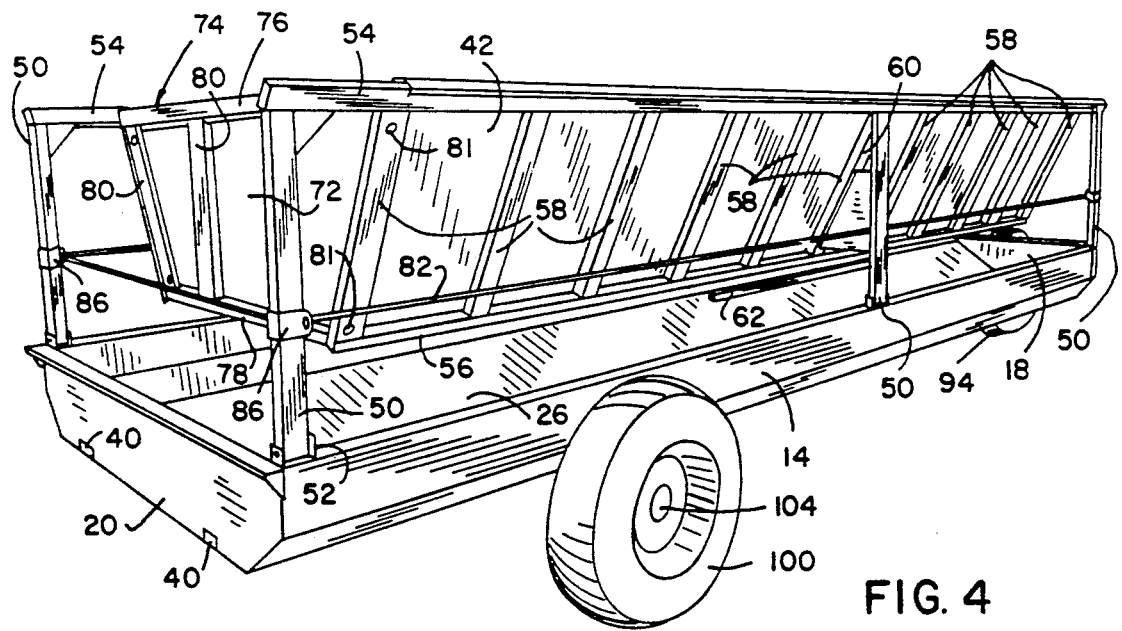
FIG. 4 is a perspective view of the fully-assembled livestock feeder of the present invention.
Figure 6:
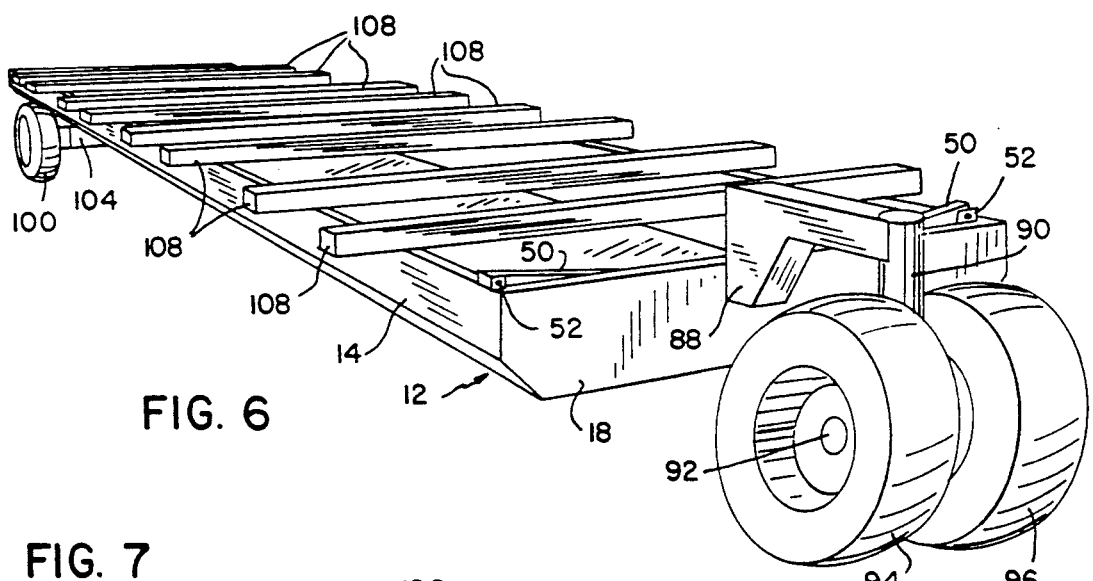
FIG. 6 is a perspective view of the livestock feeder with the end gates removed and the side walls collapsed and stowed and with cross bars added to form a bed support.

As shown in FIGS. 1, 2, 6, the bin of the preferred embodiment is defined by a pair of side walls 42, 44 (FIG. 5) which are adapted to be folded down into the bed 26. This permits easy shipment from the factory, with entire assembly of FIG. 1 being less than two feet in height. This also reduces storage space of the unit, as well as increasing its versatility, as will be described herein. The side walls 42, 44 are made of a suitable flat sheet material such as galvanized steel or the like and are each supported by a respective frame 46, 48. As best shown in FIGS. 4 and 5, the frames 46, 48 are inclined toward the center of the bed 26 and are each mounted on a plurality of supports or legs 50 which are attached to the wagon frame 12.

Each leg 50 is carried in a hinge bracket 52 which is welded or otherwise suitably mounted on the side panels 14, 16 of the wagon frame 12. A pivot pin 55 holds the legs 50 in the brackets and permits the legs 50, frames 46, 48 and side walls 42, 44 to swing from the stowed position of FIGS. 1 and 6 to the assembled position of FIGS. 3, 4 and 5. In the preferred form, the frames 46, 48 each comprise a top rail 54, a bottom rail 56 and a plurality of struts 58 welded or suitably secured to form a unitary framework for supporting the respective side walls 42, 44. The frames 46, 48 are maintained in an inclined relationship relative to the legs 50 by gussets 60, which are welded or otherwise suitably secured to selective legs 50 and struts 58 (FIG. 5). The resulting inclined flat surface assures that feed materials slide downwardly from the bin into the trough areas 32, 34 without bridging.

The angle of the incline of the side walls 42, 44 is selected such that when the side walls are pivoted into the stowed position of FIGS. 1 and 6, the side walls mate with and rest on the respective bed incline areas 28, 30 in a nested relationship. When pivoted to the upright position of FIGS. 3, 4 and 5, the side walls 42, 44 and respective frames 46, 48 are held in the open position by the braces 62, 64, respectively. A pair of suitable mounting brackets 66 are provided on center rail 41, each for receiving one end of the respective brace 62, 64 and a similar pair of brackets 68 are provided on the center legs 50 (FIG. 5), each for receiving the other end of the respective brace 62, 64. As shown, the braces 62, 64 may be secured to the brackets 66, 68 by a pin, a bolt and nut fastener or other well-known means. When the side walls 42, 44 are pivoted from the nested position to the open position, the respective braces 62, 64 are placed between the brackets 66, 68, the bin side walls 42, 44 are secured in place to define the side of the feed dispensing and storage bin.

End gates 70 (FIG. 5) and 72 (FIG. 4) comprise a flat sheet wall made of galvanized steel or similar suitable material, each supported on a frame 74 (FIG. 4). The frames 74 are each defined by a top rail 76, a bottom rail 78 and a plurality of struts 80. The outer struts are angled to define a trapezoidal frame for the gates. The trapezoidal gates 70, 72 are each adapted to fit in the opening defined by and between the inclined side walls 42, 44. Complementary through holes 81 are provided in the side wall struts 46 and complementary end gate struts 80, through which pins, nut and bolt fasteners or the like may be placed to secure the end gates to the structure. , When secured, the end gates 70, 72 and frames 74 further assure the rigidity of the final assembly. The fully assembled end gates 70, 72 and side walls 42, 44 form a storage and dispensing bin for feed such as, by way of example, hay or other loose bulk feed. The open space between the bottom frame rails 56 and 78 and the wagon frame 12 provide animal access to the trough areas 32, 34.

In the preferred embodiment, a cable system is secured to the legs 50 and includes a cable 82 which surrounds the entire periphery of the bunk feeder wagon (FIG. 4). As shown, a plurality of movable cable support brackets 86 are mounted, one each on each of the corner legs 50. A pulley guide 84 is carried in each bracket 86 for receiving the cable 82. Preferably, the brackets 86 are vertically adjustable on the legs 50, whereby the height of the cable 82 may be adjusted to accommodate the feeding of different size animals.

Figure 7:
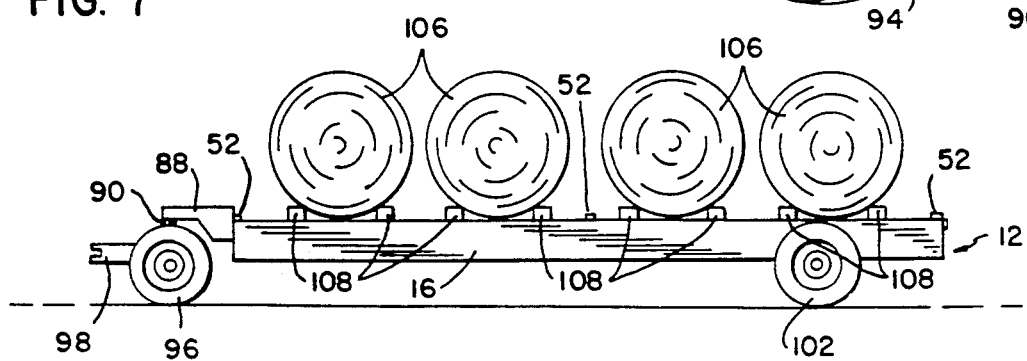
FIG. 7 is a side view of the bunk feeder wagon of FIG. 6.

As shown in FIG. 5, the hitch support 88 is welded to the front end panel 18 of the wagon frame and includes a vertical cylinder 90 for rotatably supporting the front axle assembly 92 of the wagon. This permits the front wheels 94, 96 to be mounted in front of the wagon frame to accommodate a full 180° turning angle of the front wheels. A tongue hitch 98, as shown in FIG. 7, may be secured to the axle assembly 92 for trailing the wagon behind a tractor or the like. The rear wheels 100, 102 are each rotatably mounted on a rear axle assembly 104 which is secured to the wagon frame 12 in the manner well known.

As designed, the bunk feeder wagon of the subject invention may be shipped from the factory in the nested, disassembled configuration shown in FIG. 1. The side walls 42, 44 are in the nested, closed position, and the end gates 70, 72, wheels 94, 96, 100, 102, the cable 82 and the braces 62, 64 may be placed on the nested side walls. In the preferred embodiment, the entire shipping assembly is less than two feet in height, facilitating stacking on flat-bed transfer trucks and greatly reducing freight charges relative to those incurred in shipping fully-assembled feeders.

Figure 3:
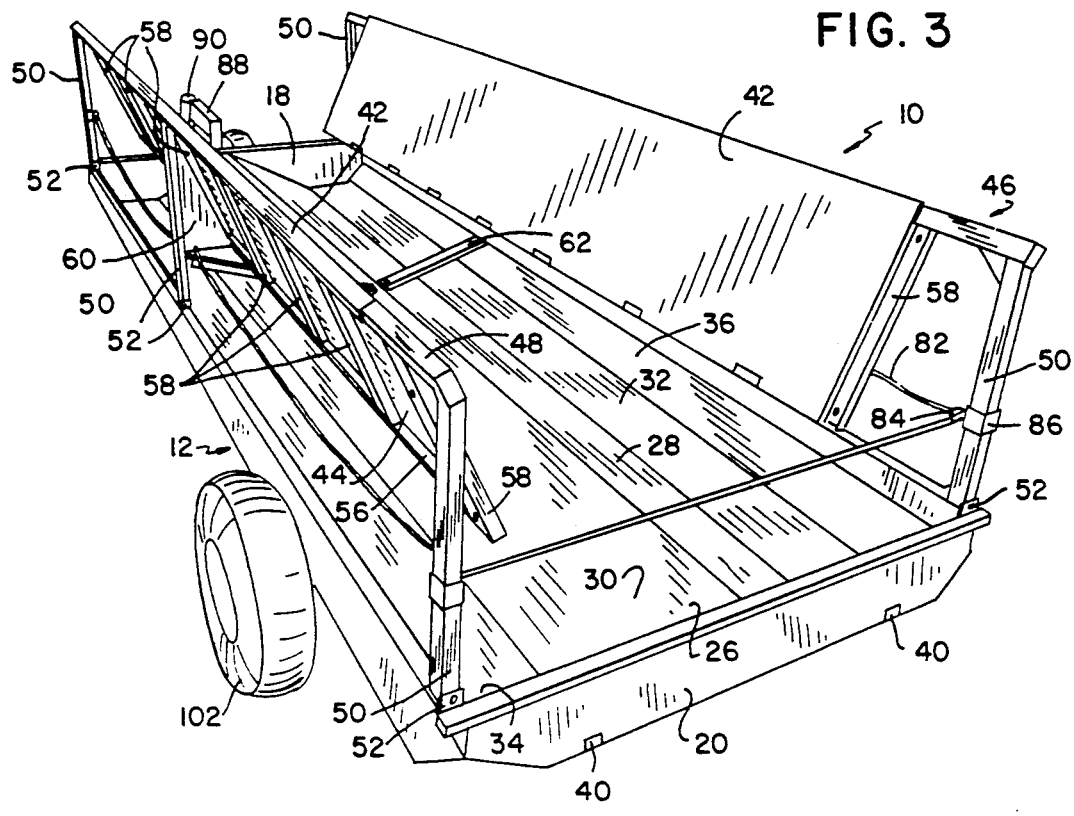
FIG. 3 is a perspective view similar to FIG. 2, showing a second side wall raised to the open position.

Once the bunk feeder wagon reaches its destination, the wheels are mounted on their respective axles and the wagon may be towed in its unassembled form. To assemble the bunk feeder, the remaining stowed components are removed and the side walls 42, 44 are pivoted to the open position and braced by the braces 62, 64, as shown in FIGS. 2 and 3. The end gates 70 and 72 are then mounted as shown in FIGS. 4 and 5, after which the height of the cable 82 is adjusted and the cable is tightened to provide a horizontal height barrier for specific animals, in the manner well known. In its preferred form, the wagon may be transformed from the stowed, nested configuration to the fully assembled configuration of FIG. 4 in less than 30 minutes, not including the mounting of the wheels.

As illustrated in FIGS. 6 and 7, when the side walls 42, 44 and end gates 70, 72 are in the nested stowed position, the wagon can be used to carry other payloads and may be used, for example, to transport full-size, large round bales of hay 106. A series of cross members such as the 4"×4" timbers 108 are placed on and span the opposite side panels 14 and 16 of the wagon frame 12, and the bales 106 are supported thereon. In the preferred embodiment, 10 or 12 foot long timbers 108 are used, whereby two bales can be placed end-to-end, allowing up to 8 to 10 bales to be easily transported using the bunk feeder wagon.

It is also possible and in some cases desirable to remove the assembled bin from the wagon frame 12 to expose the bed for alternate uses. This can be accomplished by removing pins 55 from brackets 54 (FIG. 5) and removing the braces 62, 64 (FIG. 5). The assembled bin may then be lifted off of the wagon frame 12.

While a preferred embodiment of the invention has been described in detail herein, it will be understood that the invention encompasses all of the enhancements and modifications within the scope and spirit of the following claims.

I claim:

1. A livestock feeder of the type having a peripheral framework having opposite sides and ends and an upper edge defining a perimeter, a bed carried by the framework and defining a feed trough, and a bin mounted on the framework above and spaced from the bed for storing and dispensing feed into the feed trough, the space between the trough and the bin providing access to the trough and the dispensed feed, the livestock feeder comprising:
 a. a pair of bin side sections, each pivotably mounted on an opposite side of the framework and movable between an open, upright bin-defining position and a closed, collapsed position wherein said side sections lie on said bed and substantially beneath the perimeter of the frame; and
 b. a pair of bin end sections each releasably secured to the bin side sections for holding the bin side sections and the bin end sections in the open and secured position, wherein said bin end sections may be removed from said bin side sections for collapsing said bin side sections onto said bed.

2. The livestock feeder of claim 1, the bed further including trough areas adjacent to and extending substantially the length of the opposite sides of the framework and an inclined center section between the trough areas and in the center of the bed for directing feed from the bin toward and into the trough areas, the side sections of the bins mounted such that the side sections conform to and rest on the inclined center section of the bed when the side sections are in the closed, collapsed position.

3. The livestock feeder of claim 1, each side section of the bin further comprising:
 a. a plurality of legs pivotably mounted on the framework of the feeder;
 b. a bin side frame mounted on the legs;
 c. a flat side wall mounted on and carried by the bin side frame, the side wall having a bottom edge which is spaced from the feed trough areas of the bed.

4. The livestock feeder of claim 3, each side section of the bin inclined downwardly and inwardly toward the center of the bed when the side sections are in the open position.

5. The livestock feeder of claim 3, the bed including a raised center section which is inclined downwardly and outwardly toward the opposite sides of the framework of the feeder for directing feed from the dispensing bin toward said opposite sides.

6. The livestock feeder of claim 3, wherein the bin end sections comprise a pair of removable end gates adapted to be secured to the bin side frames for closing the ends of the bin and defining with the bin side walls a feed storage and dispensing bin when secured to the open bin side frames.

7. The livestock feeder of claim 6, the end gates being adapted to lie on and nest against the bin side frames when said frames are in the closed position and the end gates are removed.

8. The livestock feeder of claim 7 including front and rear axles mounted on the framework of the feeder and wheels rotatably mounted on said axles, said bin side frames adapted for receiving and stowing said wheels when said legs are in the closed position, facilitating shipment of the livestock feeder in a disassembled condition.

9. The livestock feeder of claim 1, each bin side section further including a removable brace releasably secured to the side section and the wagon bed for holding the bin in the open position.

10. The livestock feeder of claim 9, including a cable mounted above the framework and extending about the periphery of the bed for restraining the removal of livestock from the feeder.

11. The livestock feeder of claim 10, including means for selectively adjusting the vertical distance between the cable and the bed for accommodating different sizes of livestock.

12. The livestock feeder of claim 9, further comprising a rear axle mounted on one end of the framework and a pivotable hitch and front axle mounted on the opposite end of the framework, and a plurality of wheels mounted for rotation on the axles.

13. The livestock feeder of claim 12, the side walls of the bin adapted for receiving and stowing the wheels when the side walls are in the closed position, thereby facilitating shipment of the feeder in an unassembled condition.

14. The livestock feeder of claim 12, the front wheel axle being mounted forward of the end of the framework, whereby the front wheels may be turned a full 180°.

15. A livestock feeder of the type having a peripheral framework having opposite sides and ends, a bed carried by the framework and defining a feed trough, and a bin mounted on the framework above and spaced from the bed for storing and dispensing feed into the feed trough, the space between the trough and the bin providing access to the trough and the dispensed feed, the livestock feeder comprising:
 a. a pair of bin side sections each pivotably mounted on an opposite side of the framework and movable between an open, upright bin defining position and a closed, collapsed position wherein said side sections lie on said bed; and
 b. a pair of bin end sections each releasably secured to the bin sections for holding the bin side sections and the bin sections in the open and secured position, wherein said bin end sections may be removed for collapsing said bin side sections, the framework of the feeder further including side and end panels which extend above the bin side sections when said bin side sections are in the closed position, whereby the framework can support a payload without damage to the bin side sections and the bed.

* * * * *

UNITED STATES PATENT AND TRADEMARK OFFICE
CERTIFICATE OF CORRECTION

PATENT NO. : 5,092,273

DATED : March 3, 1992

INVENTOR(S) : Larry A. Meyer

It is certified that error appears in the above-identified patent and that said Letters Patent is hereby corrected as shown below:

Column 6, line 54, after the first occurrence of "bin", insert -- side --;and
Column 6, line 55, after "bin", insert -- end --.

Signed and Sealed this

Twenty-fifth Day of May, 1993

Attest:

MICHAEL K. KIRK

Attesting Officer

Acting Commissioner of Patents and Trademarks